Dec. 11, 1962     C. N. POTTER ET AL     3,067,731
MASONRY CHIPPING MACHINE
Filed July 22, 1960     2 Sheets-Sheet 1
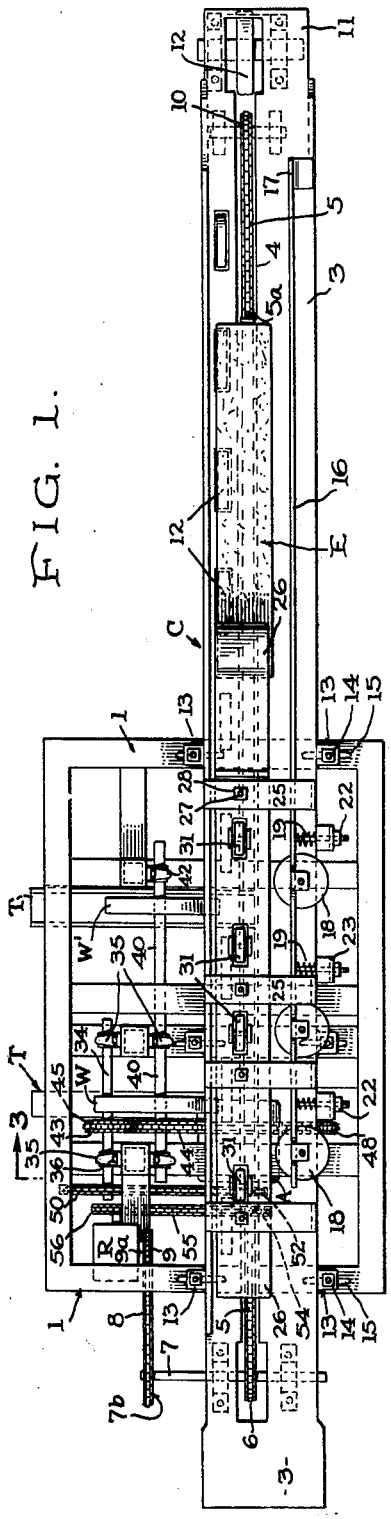
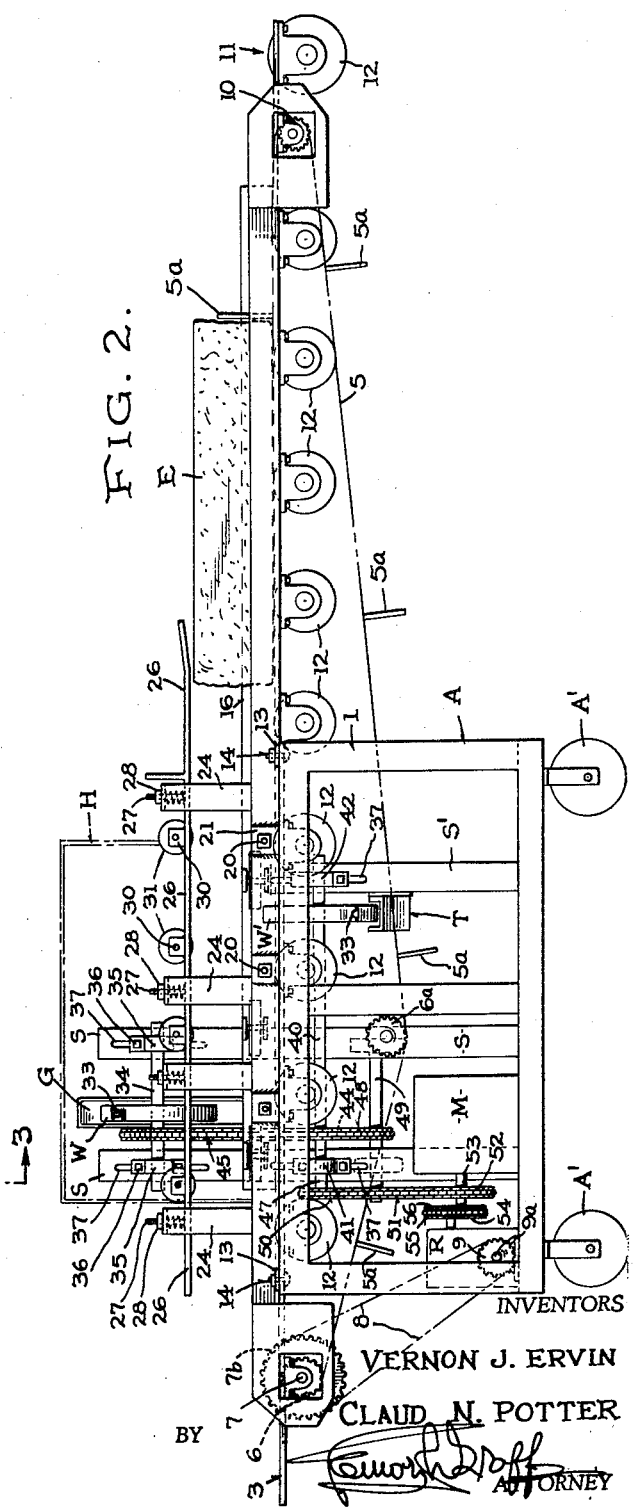
INVENTORS
VERNON J. ERVIN
CLAUD N. POTTER
BY
ATTORNEY

INVENTORS
VERNON J. ERVIN
CLAUD N. POTTER
BY
ATTORNEY

United States Patent Office 3,067,731
Patented Dec. 11, 1962

3,067,731
MASONRY CHIPPING MACHINE
Claud N. Potter and Vernon J. Ervin, Mesquite, Tex.; said Potter assignor of one-sixth each to Raphael H. Ehrlich, Sylvan H. Garonzik, and Vernon J. Ervin, all of Mesquite, Tex.
Filed July 22, 1960, Ser. No. 44,630
3 Claims. (Cl. 125—3)

This invention relates to a masonry chipping machine of the type shown in our former Patent No. 2,801,626, dated August 6, 1957, and more particularly to improvements to adapt the machine disclosed therein to handle not only bricks but also quarried blocks of stone.

Where bricks or stone are desired to be provided with an ornamental horizontal face, or end portion, it has generally been customary in the past to prepare such faces or ends by hand-chipping. Not only is this method slow and laborious, but expensive from the standpoint of time and labor involved.

Accordingly by way of enlarging the scope of operations of our former machine, the present machine is intended to mount the chipping wheels in a manner that may be adjusted vertically relative to each other and to the general plane of the conveyor so that the chipping wheels may be moved closer together or farther apart to handle masonry elements of different height or depth according to specifications of the product at hand or whether the machine is being used in a stone quarry or brick yard.

Another object of the invention is to adjustably mount the conveyor to move horizontally with reference to the relatively fixed peripheral path of the chipping wheels to take care of conditions where the masonry article to be operated upon is of greater or less width than other articles of the same type. To accomplish this purpose the means for guiding the article of masonry by the conveyor is made of sufficient width so that it is possible to run the brick or the like sidewise as well as endwise through the machine because it is necessary to provide a certain percentage of masonry elements chipped on the end as well as the side to be used where adjoining masonry walls meeet at a right angle. This feature also enables the machine to chip special sizes of wide brick.

A further object of the invention is to provide a self-contained mobile machine, useful wherever electric power is available, to operate a single electric motor which in turn synchronously drives suitable shafts and chains to effect operation of the chipping wheels as well as the conveyor, the latter being driven by the motor through suitable speed reducing gear.

With the above and other objects in view which will more readily appear as the nature of the invention is better understood, the invention consists in the novel construction, combination, and arrangement of parts, hereinafter more fully described, illustrated and claimed.

A preferred and practical embodiment of the invention is shown in the accompanying drawings, in which:

FIGURE 1 is a top plan view of the improved apparatus.

FIGURE 2 is a side elevation of the construction shown in FIGURE 1.

Similar reference characters designate corresponding parts throughout the several figures of the drawings.

*General Description*

Figures 3, 4, 5:
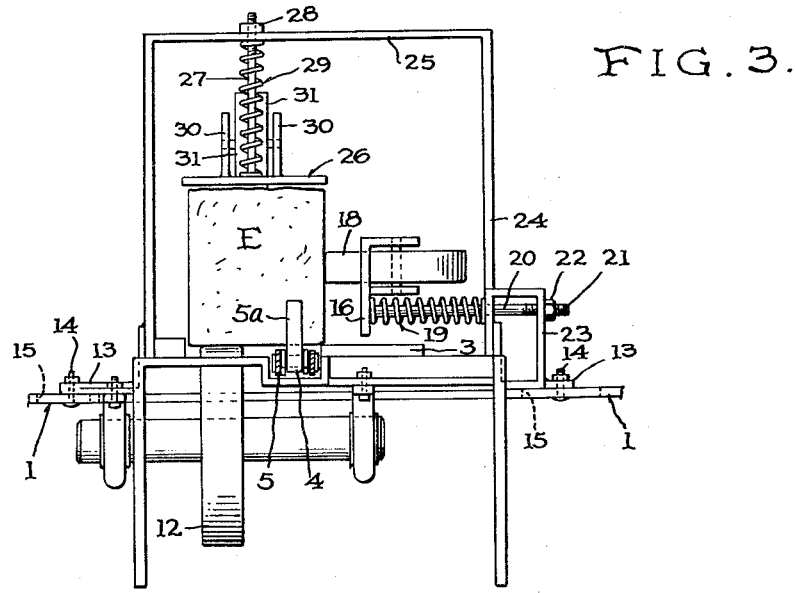
FIGURE 3 is a partial enlarged detail cross-sectional view taken on the line 3—3 of FIGURE 1.
FIGURE 4 is an end elevation of the apparatus shown in FIGURE 2 as observed from the lefthand end thereof.
FIGURE 5 is a diagrammatic view of the motor driven chain arrangement for drivng the chipping wheels.

Referring first to FIGURES 1 and 2, it will be seen that the apparatus in its general organization includes a mobile base designated generally as A and mounted on suitable casters or wheels A'. This base is fabricated from suitable frame parts to be of generally rectangular formation and of sufficient length, breadth and height to support the instrumentalities hereinafter referred to.

For example, the opposite top end rails 1—1 support a combined conveyor and guide means designated generally as C. As will presently appear, this means for guiding the masonry elements is adjustable laterally or horizontally on said rails 1—1 relative to upper and lower chipping wheels W and W' respectively. The upper chipping wheel may be provided with a guard G. These wheels are suitably driven in a manner later to be described and may be adjusted vertically on their adjacent parallel upright supports S and S' so that they may be selectively set closer together or farther apart with respect to the general horizontal plane of the conveyor so as to accommodate masonry elements of different vertical dimensions.

Troughs T are provided below the chipping wheels to carry off the chips and a hood H may be placed over the zone of the wheels to insure safety against flying chips.

All of the mechanism is simultaneously driven by a motor M through suitable sprocket and chain arrangements, including a speed reducer R for operating the conveyor chain. As shown, the motor and speed reducer are conveniently mounted on the bottom frame portion of the base A.

*Conveyor and Masonry Guide*

As will be seen from FIGS. 1 and 2, the masonry element E to be operated upon is propelled over a conveyor platform 3 having a channel 4 receiving a propelling chain 5.

This platform projects well to opposite sides of the top end rails 1—1, and the chain 5 sheaved at one end over a sprocket 6, slidably keyed or splined to drive shaft 7 suitably journalled at 7a below the platform 3, and having a second sprocket 7b operated by a drive chain 8. This chain is heaved over sprocket 9 of shaft 9a of the speed reducer R.

The conveyor chain 5 is provided at one side with a plurality of offset pusher bars 5a intended to pick up and carry the masonry element along over the platform 3 from the righthand end of the machine of FIGURE 1, toward the lefthand side thereof, the masonry elements E being deposited adjacent the receiving end of the sprocket chain 5 which passes over the idler sprocket 10 at the loading end 11 of the conveyor.

As will be seen from FIGURES 1 and 2, the platform 3 of the conveyor frame has suspended therefrom a plurality of anti-friction rollers 12 suitably spaced along the channel 4 so that their peripheries project above the platform to engage the masonry element and ease the burden of the pusher bars 5a as the chain propels them through the machine.

The platform 3 of the conveyor assembly is also provided with horizontal extension ears 13 (FIGS. 1 and 2) which carry a nut and bolt 14 whose shank slides in the related slot 15 in one of the end frame parts 1. By loosening the bolts 14, it will be understood that the entire conveyor platform and its appurtenances may be shifted bodily toward and from the peripheries of the chipping wheels W and W'.

For the purpose of clamping and holding the masonry piece in position to be operated upon by the chipping wheels, upper and side pressure elements are used. First, for maintaining the masonry element E projected transversely into the peripheral path of chipping wheels, a pressure bar 16, secured at one end 17, to a suitable block on the conveyor platform 3 has its opposite end carrying a plurality of spaced horizontally disposed pressure rollers 18 whose peripheral edges are disposed in a vertical plane to engage the back of the masonry piece E, FIG. 3.

The pressure on the free end of the bar 16 is regulated by a plurality of springs 19 mounted on adjustable rods 20 whose inner ends are preferably welded to the adjacent face of the bar 16 while the opposite ends 21 are threaded to receive a nut 22 to operate in conjunction with a fixed abutment bracket 23 (FIG. 3). By adjusting the nut on the rods 20, it will be understood that springs 19 surrounding the rods, and confined between the rear face of the pressure bar 16 and the inner face of the abutment bracket 23, will be subjected to more or less compression.

Secondly, in addition to the means for pressing the masonry element E horizontally toward the chipping wheels, and to hold the element down, in addition to its weight, onto the platform 3 to be moved by the bars 5a, conveyor platform 3 is provided with a series of four suitably spaced arched frames including the upright legs 24 and the horizontal top members 25.

As will be clear from FIGURE 3, the top clamping bar designated generally as 26 is supported from elements 25 by a stem 27 passing through an opening in 25 to receive a nut 28 for engaging the threads on the stem 27 whose lower end is connected to 26. A spring 29 surrounds 27 and being confined between 25 and 28 normally tends to press the bar 26 downwardly toward the masonry element 1. The upper face of the top bar 26 is provided at intervals with spaced upstanding pairs of journal plates 30—30 which pivotally receive the pressure rollers 31 in a manner that their peripheries engage the top of the element E as it travels through the guide means under the influence of the conveyor chain.

*The Chipping Wheels*

As previously indicated, the chipping wheels W and W' are vertically adjustable relative to each other and also to the general plane of the conveyor platform 3.

The chipping wheels, although spaced apart and at different elevations with respect to the fixed plane platform 5 are of identical construction. Therefore, a decription of one will suffice for the other.

Each wheel serves more or less as a flywheel and one of the wheels, for example, the upper wheel W which is disposed above the masonry is intended to turn in a clockwise direction (FIG. 4) while the lower wheel W' being disposed beneath the masonry element turns in a counter-clockwise direction. Thus, the bits 33 chip opposite sides of the masonry element. The wheels are made of any material suitable for the purpose, and have at least one said chipping bit 33 which is detachably mounted on the periphery thereof to be removable either for sharpening or replacement. Any suitable means for fastening the chipping bit to the wheel may be used, and each bit is preferably positioned on the periphery of the wheel in the same angular relation to its axis as its other wheel.

The upper wheel W is supported on a shaft 34 journalled in bearing blocks 35, each of which is adjustable upon a related one of a pair of spaced upright supports S. That is to say, each bearing block 35 has bolts 36 slidable in a slot 37 in its related support. In a similar manner the lower wheel W' is carried by shaft 40 mounted in journal blocks 41 and 42, the first of which is slidably mounted on what may be conveniently termed the first one of the pair of uprights S, while the second is adjustably mounted on a third upright S'.

Accordingly, it will be understood that the bearing blocks 35 and 40 and 41 are provided with identical means for fastening them to a related support. Upon loosening the bolts 36 in slot 37, the wheels W and W' may be adjusted up and down as desired.

*The Driving Means*

In order that the wheel W may be turned clockwise while the wheel W' is turned counterclockwise as viewed in FIGURE 4, a chain 45 is looped about the upper sprocket 43 on the shaft 34 and one reach 45a of the loop after passing around the driving sprocket 46 on power shaft 47 goes around idler sprocket 48 on shaft 49. The reach 45b of the chain after passing around idler sprocket 48 passes beneath and engages the sprocket 44 on shaft 40, which carries the chipping wheel W'. The chain reach 45c thence loops about the sprocket 43 on shaft 34 carrying wheel W.

It will thus be seen that with the arrangement above described, the chipping wheels W and W' may be moved upwardly and downwardly while the chain 45 remains in engagement with the sprockets 43 and 44 respectively.

The power shaft 47 carrying the driving sprocket 46 has mounted thereon a sprocket 50 about which a chain 51 is looped and similarly passes over the driving sprocket 52 of the motor shaft 53.

The single electric motor M is the primary source of power for not only operating the chipping wheels but also operating the conveyor 5 in synchronism with the wheels. Thus, with the present invention as distinguished from our prior patent only a single prime mover or motor is required. Moreover, all of the operations are better synchronized and are set up for reliable continuous movement.

Having described the means for operating the chipping wheels, it may be pointed out that the conveyor chain 5 sheaved over the sprockets 6, 6a and 10 is driven through the medium of speed reducer R.

As shown in FIGURES 1, 2 and 4, the motor shaft 53 is connected by sprocket 54 with a chain 55 which is sheaved over sprocket 56 of the speed reducer R to drive it. Noting particularly FIGURES 1 and 2, it will be seen that the side of the speed reducer at right angles to sprocket 50 has the shaft 9a, previously referred to, carrying sprocket 9 which in turn is engaged by chain 8 sheaved over sprocket 7b keyed fast to shaft 7 upon which is mounted the sprocket 6 for engaging with the conveyor chain 5.

Because of the utilization of the gear reducer R, it is apparent that the movement of the chain 5 and its bars 5a is relatively slow as compared with the speed of the chipping wheels, but, it will of course be understood that the movement of the conveyor which carries the masonry element E is synchronized with the chipping wheels W and W' according to the degree and kind of chipping to be done on the masonry block.

*General Operation*

Assuming that the apparatus is set up for use as shown in FIGURES 1 and 2, it will be understood that the masonry element E will be placed on the conveyor platform 3 to be picked up by the cross bars 5a of the conveyor chain. These bars move the block E toward the chipping wheels W' and W in that order. The block E is held downwardly in addition to its own weight by the upper clamping bar 26 and is yieldingly urged toward the cutter's circle of the chipping wheels by the pressure bar 16.

Because of the lateral adjustability of the conveyor platform 3 and its associated parts with respect to the relatively fixed axial positions of the chipping wheels W and W', it will be understood that after a piece of brick or other masonry is chipped along at one of its long edges, it may then be turned around with its long dimension transversely of the conveyor so that the end face will be subjected to the cutter 33. In other words, taking the dimension of a building brick, usually four by eight inches if the conveyor is set so that the wheels 18 (FIG. 3) and the upper clamping plate 26 and roller 31 engage the long dimension of the brick so that the edges of its long side may be chipped, after the chipping of the sides has been accomplished, the bricks may be removed from the conveyor and placed with their long dimensions transversely of the conveyor so as to present one end thereof to the cutters. By running a plurality of bricks through the machine in this fashion, all of the ends will be chipped rapidly and efficiently. Of course, in the event it is desired to chip the end of a piece of stone after the long or outer face has been chipped, the position of the conveyor platform 3 relative to the chipping wheel circle may be adjusted so as to chip the end of the piece of stone.

After the masonry element E has been operated on by both chipping wheels, it continues to be propelled over the platform 3 by the conveyor bars 5$^a$ until it reaches the delivery end of the apparatus, namely the lefthand end of FIGS. 1 and 2.

From the foregoing it will now be seen that the present invention provides a machine which is substantially fully automatic in the sense that it performs all of its working functions as long as it is fed or supplied with masonry material to be worked upon.

We claim:
1. An improvement in masonry finishing machines including, in combination, upper and lower chipping wheels on horizontal shafts, a frame, an endless conveyor including a platform having a channel, an endless chain operating in said channel and sheaved over driving and driven sprockets, and having its top reach moving in a path parallel to the peripheries of said wheels, pusher bars carried by the chain and projecting above the platform, masonry supporting rollers carried by and also projecting above the platform at one side of the channel, means for adjusting the platform at right angles to the peripheral portions of the chipping wheels, a pressure bar carried by the platform for urging the masonry toward the chipping wheels, means effecting relative vertical adjustment of said shafts relative to each other and also effecting a corresponding adjustment of the peripheries of said chipping wheels relative to the paths of the upper reach of said conveyor, means for driving said horizontal shafts respectively in clockwise and counter-clockwise directions and simultaneously moving the conveyor, said means comprising, a sprocket wheel on each related chipping wheel shaft, a driven sprocket on said sprocket shaft, an idler sprocket, a chain looped about said idler sprocket and having one reach engaging opposite sides of said sprocket wheels on the chipping wheel shafts and the other reach looped about the driven sprocket of the driven sprocket shaft, a driving sprocket on said driven sprocket, a single motor-driven shaft having a driving connection with the driving sprocket on said driven sprocket shaft, and a conveyor driving sprocket wheel powered through gear ratio reduction means and having a driving connection with said sprocket driving wheel of the conveyor.

2. An improvement in masonry finishing machines according to claim 1, wherein, the pressure bar has a plurality of rollers with their peripheries disposed toward the chipping wheels.

3. An improvement in masonry finishing machines according to claim 1, wherein, the conveyor includes an arched frame disposed over the platform, and a spring urged masonry clamping bar is carried by said frame to urge the masonry toward the platform.

References Cited in the file of this patent

UNITED STATES PATENTS

| | | |
|---|---|---|
| 1,461,707 | Hanson | July 10, 1923 |
| 1,877,269 | Colgren | Sept. 13, 1932 |
| 2,801,626 | Potter et al. | Aug. 6, 1957 |